(12) United States Patent
Schmidt

(10) Patent No.: US 6,224,175 B1
(45) Date of Patent: May 1, 2001

(54) CABINET DOOR WITH LOG FRAME

(76) Inventor: David J. Schmidt, Box 48 C-2, Deerwood, MN (US) 56444

( * ) Notice: Subject to any disclaimer, the term of this patent is extended or adjusted under 35 U.S.C. 154(b) by 0 days.

(21) Appl. No.: 09/432,689

(22) Filed: Nov. 3, 1999

(51) Int. Cl.$^7$ .................................................. A47B 97/00
(52) U.S. Cl. .......................... 312/204; 312/326; 403/401; 52/455
(58) Field of Search .................................. 312/204, 109, 312/138.1, 326; 52/455, 233, 656.4, 311.1, 311.2, 311.3; 49/501; D25/48; 403/401, 402, 403

(56) References Cited

U.S. PATENT DOCUMENTS

| | | | | |
|---|---|---|---|---|
| 1,672,419 | * | 6/1928 | Lehman | 403/401 |
| 1,690,404 | * | 11/1928 | Dieckmann | 312/204 |
| 2,607,087 | * | 8/1952 | Triller | 312/326 |
| 3,308,592 | * | 3/1967 | Miller, Jr. | 52/455 |
| 3,543,464 | * | 12/1970 | Taylor | 52/455 |
| 4,183,187 | * | 1/1980 | Simard | 403/401 |
| 4,783,945 | * | 11/1988 | Heeg | 403/401 X |

FOREIGN PATENT DOCUMENTS

2262790  *  6/1993  (GB) ..................................... 403/401

* cited by examiner

*Primary Examiner*—Peter M. Cuomo
*Assistant Examiner*—James O. Hansen
(74) *Attorney, Agent, or Firm*—Marsh Fischmann & Breyfogle LLP

(57) ABSTRACT

A frame for a cabinetry door and a facing for a dresser drawer are disclosed which utilize a log construction of sorts, and thus are particularly desirable for use with log homes. Each of the cabinetry door frame and the drawer facing utilize an at least generally convexly-shaped front surface so as to appear to be formed from a log. Further contributing to the log construction appearance of the cabinetry door frame and drawer facing is the use of larger dimensions for the cabinetry door frame and drawer facing. In this regard, the cabinetry door frame and drawer facing each may utilize piece of wood with is continuously arcuate extending between a pair of longitudinally extending sides, which in turn are spaced by a distance of at least about 3 inches.

13 Claims, 8 Drawing Sheets

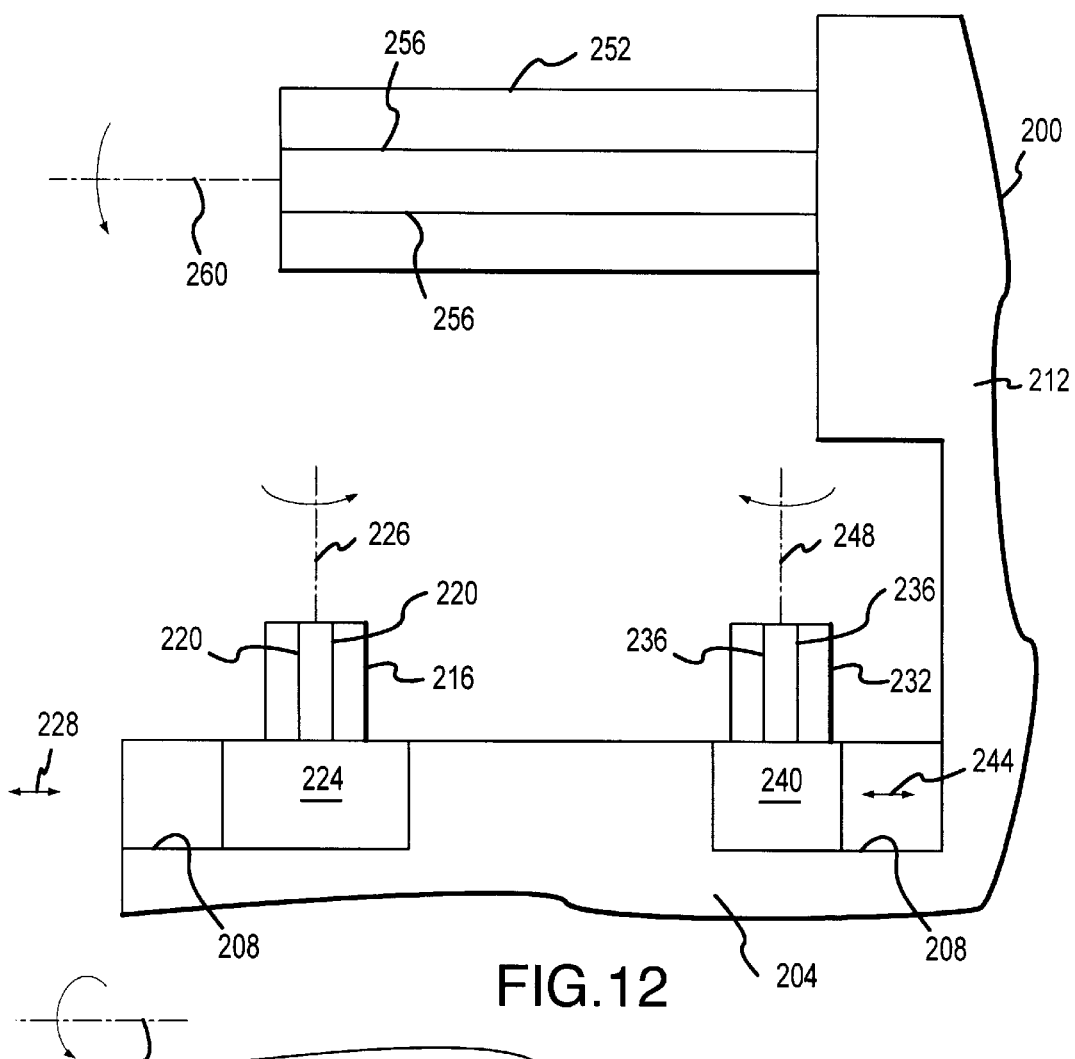
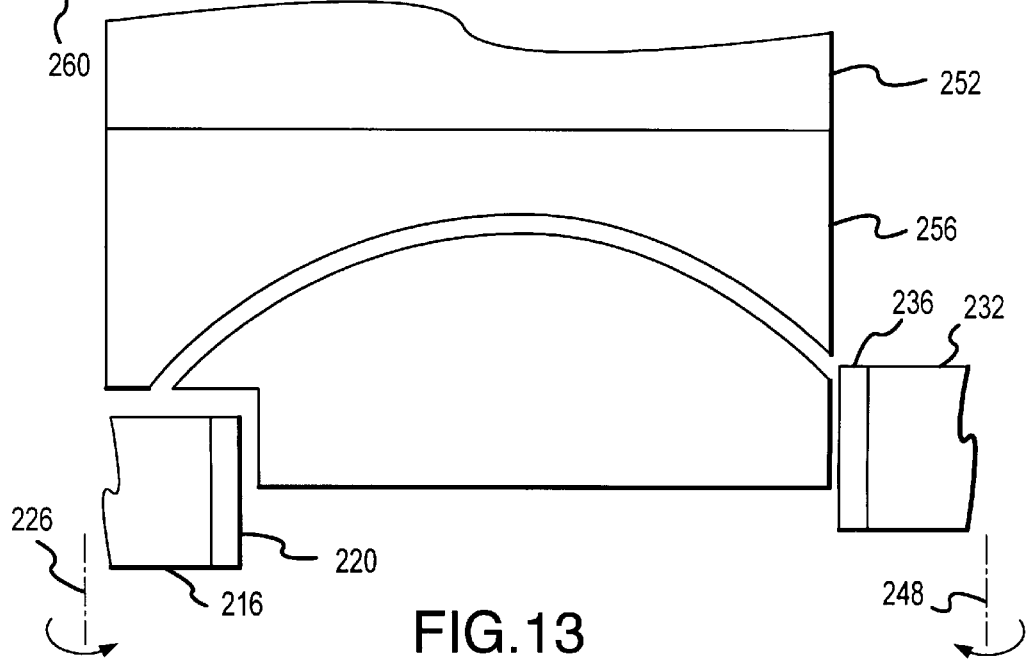

CABINET DOOR WITH LOG FRAME

CROSS-REFERENCE TO RELATED APPLICATIONS

None.

STATEMENTS REGARDING FEDERALLY SPONSORED RESEARCH OR DEVELOPMENT

None.

FIELD OF THE INVENTION

The present invention generally relates to the field of furniture and, more particularly, to a drawer, door, or the like for a storage space (e.g., cabinets, dressers) which utilizes a log or log-like frame or facing.

BACKGROUND OF THE INVENTION

Furniture has had a long existence and has been and continues to be available in a large variety of designs. Many types of articles may be classified as "furniture." Cabinetry is one such article and is utilized in kitchens and various other rooms in houses and other types of structures as well (e.g., office buildings) for the storage of appropriate articles (e.g., dishes, housewares, clothes). "Cabinets" as used herein includes those structures which are effectively "permanent" (e.g., kitchen cabinets), as well as those which are portable or readily movable (e.g., a night stand with an at least partially enclosed storage space). Another such article is a dresser which is commonly used in bedrooms to store various types of clothing or other household goods/materials.

Log homes have also had a long existence. Early settlers in the United States commonly used logs to construct their home. These types of designs continue to be popular today, including for primary residences and vacation homes as well. Aesthetics is probably the primary motivation for selecting a log home design today. Commonly the interior decor of today's log homes continues with some type of a rustic theme as well. Various types of rustic furniture are available to compliment this rustic theme. However, there continues to be a need to further compliment the log home design through its interior furnishings.

BRIEF SUMMARY OF THE INVENTION

The present invention is generally directed to furniture and, more particularly, to cabinets, cupboards, armoires, dressers, and any other type of furniture having at least one door or drawer for accessing some type of storage space or area. A first aspect of the present invention is embodied in a storage device which includes an enclosure of at least some sort (e.g., a "body" with some type of storage space therein), a first opening or access to the storage space, and a door which is movably interconnected with the enclosure (e.g., via one or more hinges) and which is at least at some point in time aligned with this first opening or access. The door may close an entirety or only part of this first opening or access. Representative examples which would embody the enclosure, first opening or access, and door of the subject first aspect of the present invention would be a "permanently" mounted cabinet or cupboard ("permanent" in the sense that it is not meant to be moved without rather considerable effort, such as a wall-mounted structure in a kitchen), as well as "portable" structures such as an end table or night stand with a storage space, a hutch, an armoire, or the like.

The door of the subject first aspect of the present invention includes a frame (e.g., wood) which is formed by a plurality of individual frame members. Various types of wood may be used for the door frame, including pine, cedar, and redwood, with pine being preferred. Commonly, four of such frame members will be utilized to define a rectangular or square "closed" configuration for the door frame (e.g., no openings in the perimeter of the frame). Each frame member includes front and back surfaces, as well as a pair of longitudinally spaced ends and pair of laterally sides extending between these two ends (i.e., the length dimension of the individual frame members is defined between its pair of ends, while the width dimension is defined between its pair of sides herein). The front surface of each of these frame members is convexly-shaped progressing from one of its sides to the other of its sides. This profile of the front surface of the individual frame members may then be characterized as giving the appearance of a log construction for the door frame of the subject first aspect. Methods for producing the above-noted storage device and components thereof are also contemplated by the subject first aspect where the above-noted individual frame members would first be formed into the above-noted profile, and thereafter assembled into a door frame which could then be incorporated with the above-noted enclosure.

Various refinements exist of the features noted in relation to the first aspect of the present invention. Further features may also be incorporated in the first aspect of the present invention as well. These refinements and additional features may exist individually or in any combination. The ends of each of the individual frame members may be mitered at an appropriate angle, most commonly at about 45 degrees. Disposing opposing mitered ends of two frame members in abutting engagement allows these frame members to be interconnected in a desired door frame configuration. Appropriate adhesives may be utilized to facilitate the interconnection. However, since these individual frame members may be significantly more "robust" than what is commonly used in prior art furniture door constructions, at least one groove may be formed on the back surface proximate each miter joint in at least one of the two frame members which define each such miter joint. The depth of each such groove may increase in the direction of the corresponding miter joint. This allows a wood screw to be directed through an end of this groove, through the remainder of the frame member having the groove(s) formed therein, through the miter joint, and into the adjoining frame member at an appropriate angle and without having the back surface of the door frame interfere with the action of the screwdriver on the screw(s). Both mechanical fasteners and adhesives may be utilized to assemble the door frame.

As noted, the frame members may be significantly more "robust" than has been commonly employed in prior art furniture door designs, which further contributes to the door frame of the subject first aspect of the present invention having the appearance of at least a log-like construction. For instance, the width of each individual frame member may be at least about three inches, the thickness or depth (i.e., the distance between a front surface and a corresponding back surface) of each frame member may be at least about 1½ inches at the apex of the convexity, or both, which appropriately simulates a log construction for the door frame of the subject first aspect. Another way to characterize a log construction appearance for the door frame is to define the front surface of each of the frame members at least generally by a radius which extends between its pair of sides (e.g., about a three inch radius in one embodiment). Yet another way to characterize a log construction appearance for the door frame is by having the front surface of each frame member be at least substantially continuously arcuate between its pair of sides.

A center panel may be attached to the door frame of the subject first aspect of the present invention to occupy the space disposed inwardly of its perimeter. This center panel may be inset within a groove formed on the back surface of the door frame (e.g., a notch or groove formed on an edge of each of the individual frame members). Appropriate materials for the center panel include wood, and various types of glass (e.g., clear, smoked, colored, leaded). Various grooves may be formed on the front surface of the center panel (e.g., one or more vertically extending, generally v-shaped grooves). The center panel may also have a more robust thickness compared to center panels commonly employed in prior art furniture door designs. For instance, one embodiment of such a center panel has a thickness of at least about ¼–¾ inches. One or more boards may also be attached to the front surface of the center panel. Routering of the edges of these center panel boards may be utilized as well. Moreover, any such center panel boards may be of equal width, unequal width, or some combination thereof (e.g., two may be of the same width, and the third may be of unequal width). Any such center panel boards may also be rather robust, each having in one embodiment a thickness of at least about ¾ inches.

A second aspect of the present invention is a embodied in a storage device which includes an enclosure of at least some sort, a first opening to the storage space associated with the enclosure, and a drawer which is movably interconnected with the enclosure (e.g., via one or more slide mechanisms) and further within this first opening. This drawer includes a facing which includes a front surface and a back surface. Typically the facing will be separately attached to the main body of the drawer, which will commonly use a box-like construction with an open top. The facing is defined by at least one board which has a pair of longitudinally spaced ends and a pair of laterally spaced sides. The width of this facing board (i.e., the distance between the sides) in one embodiment is at least about three inches, and a portion of this facing board is continuously arcuate extending between its pair of sides. This gives at least the appearance that the facing is formed from one or more logs. Typically the facing board(s) will be at least substantially horizontally disposed when the drawer is disposed within the first opening of the enclosure, such that the noted sides of the facing board(s) will be vertically spaced and laterally extending. Larger sized first openings may allow the facing of the drawer to be defined by two of the noted facing boards. Those features discussed above in relation to the door frame members may be incorporated into each of the facing boards utilized by the drawer associated with this second aspect of the present invention as well. Methods for producing the above-noted storage device and components thereof are also contemplated by the subject second aspect where the above-noted facing would first be formed into the above-noted profile, and thereafter assembled into a drawer which could then be incorporated with the above-noted enclosure.

BRIEF DESCRIPTION OF THE SEVERAL VIEWS OF THE DRAWING

FIG. 12 is an end view of one embodiment of a moulder which may be used to form the frame members door facings presented herein.

FIG. 13 is a schematic of the profile of one embodiment of knives for the cutters which may be used by the moulder of FIG. 12 to form the frame members and door facings presented herein.

DETAILED DESCRIPTION OF THE INVENTION

Figure 1:
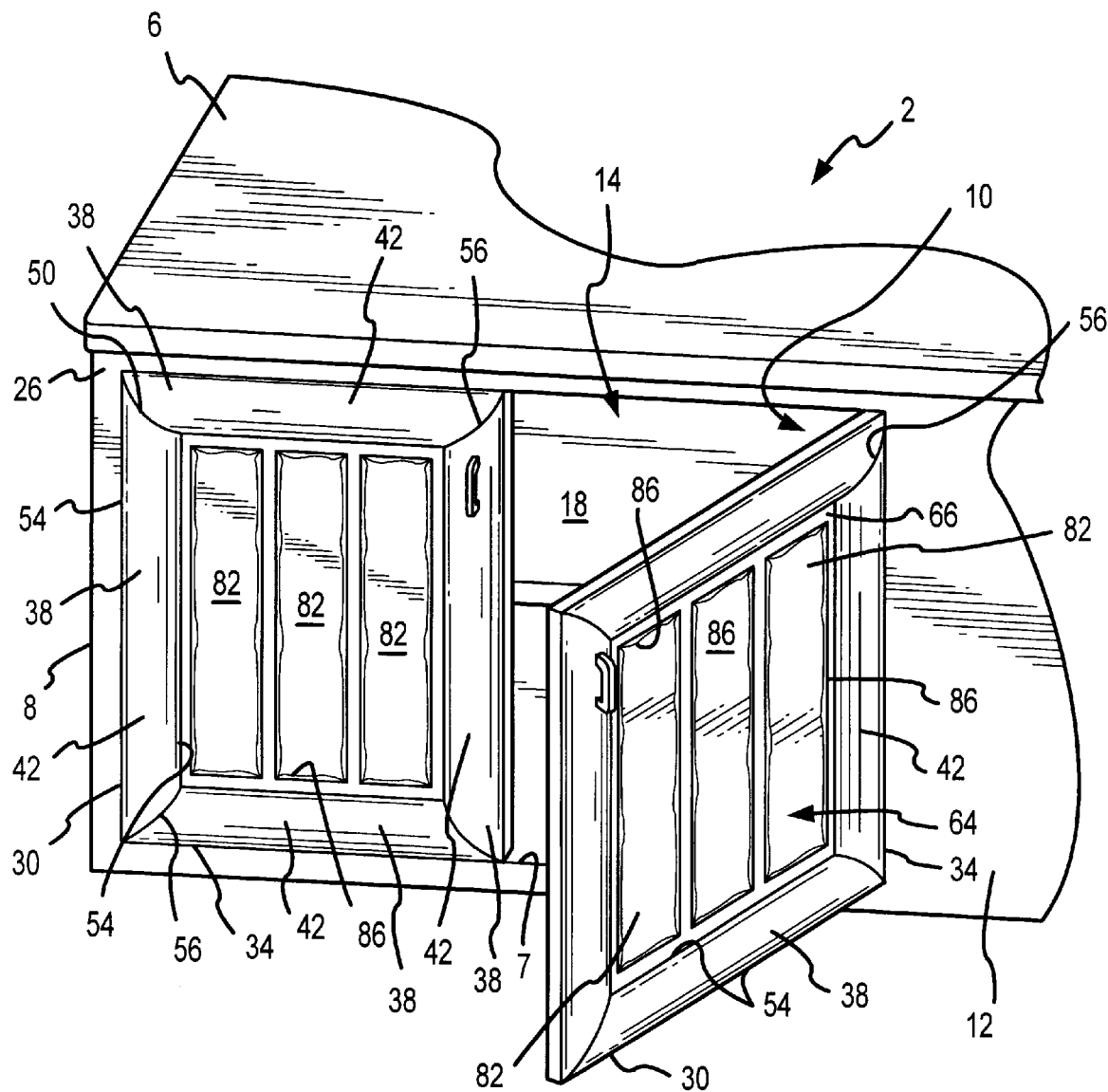
FIG. 1 is a perspective view of a storage cabinet having doors with an at least a simulated log-frame-like construction.

The present invention will now be described in relation to the accompanying drawings which at least assist in illustrating its various pertinent features. FIG. 1 presents a portion of an enclosure or a storage cabinet 2 of the type which may be used in a kitchen or any other appropriate area of a house or the like. The cabinet 2 includes a top 6, a bottom 7, a pair of ends 8 (only one shown), and typically a back (not shown) to define at least part of a space or interior 10 for the storage of appropriate items (e.g., dishes, other housewares, clothes). Both permanent and portable constructions are contemplated for the cabinet 2 (e.g., the cabinet 2 may be mounted to a wall or the like, the cabinet 2 may be a piece of bedroom furniture or the like which may be readily moved). One or more shelves 18 may be disposed within the interior 10 as desired/required. Another portion of the cabinet 2 is its front 12 which also assists in the definition of the noted interior 10 and which will typically include a number of pieces of trim board 26. Access to the interior 10 of the cabinet 2 is provided by including at least one, and typically a plurality, of openings or accesses 14 on the front 12 of the cabinet 2. Aligned with each these openings 14 is at least one door 30 which may be opened and closed when providing/removing contents from the interior 10 of the cabinet 2. Appropriate hinges or the like (not shown) movably interconnect the doors 30 with the cabinet 2. Only the doors 30 are of particular relevance to the cabinet 2, and therefore the door(s) 30 may be used with any other storage cabinet design.

Each door 30 of the cabinet 2 includes a frame 34 (e.g., formed from wood), as well as a center panel assembly 64 which includes a center panel 66 and one or more boards 82 separately attached thereto. The center panel 66 is appropriately secured to the door frame 34, and the boards 82 are appropriately secured to a front surface 70 of the center panel 66. One key feature of the doors 30 is the structure of the door frame 34. In this regard, each door frame 34 is defined by a plurality of appropriately interconnected frame members 38 (e.g., formed from wood). Four such frame members 38 will be used to define a square or rectangular configuration for the door frame 34 with a "closed" perimeter. Other configurations for the door frame 34 may be utilized as well. As will be discussed in more detail below, the door frame members 38 at least simulate or emulate the appearance of having been formed from logs. Therefore, the doors 30 are particularly desirable for incorporation into furniture for log homes or the like.

Figure 2:
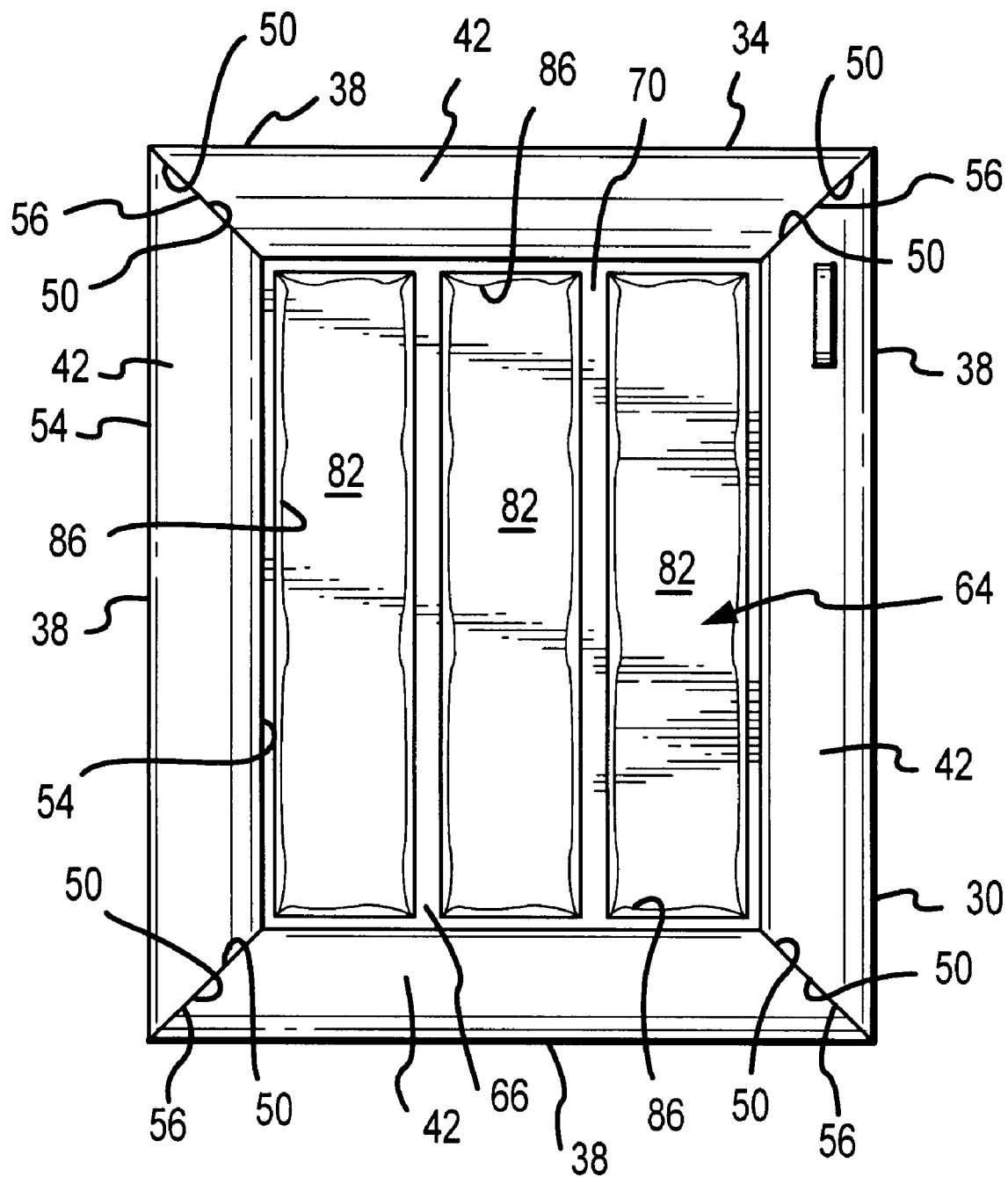
FIG. 2 is a plan view of a front surface of one of the doors used by the cabinet of FIG. 1.
Figure 3:
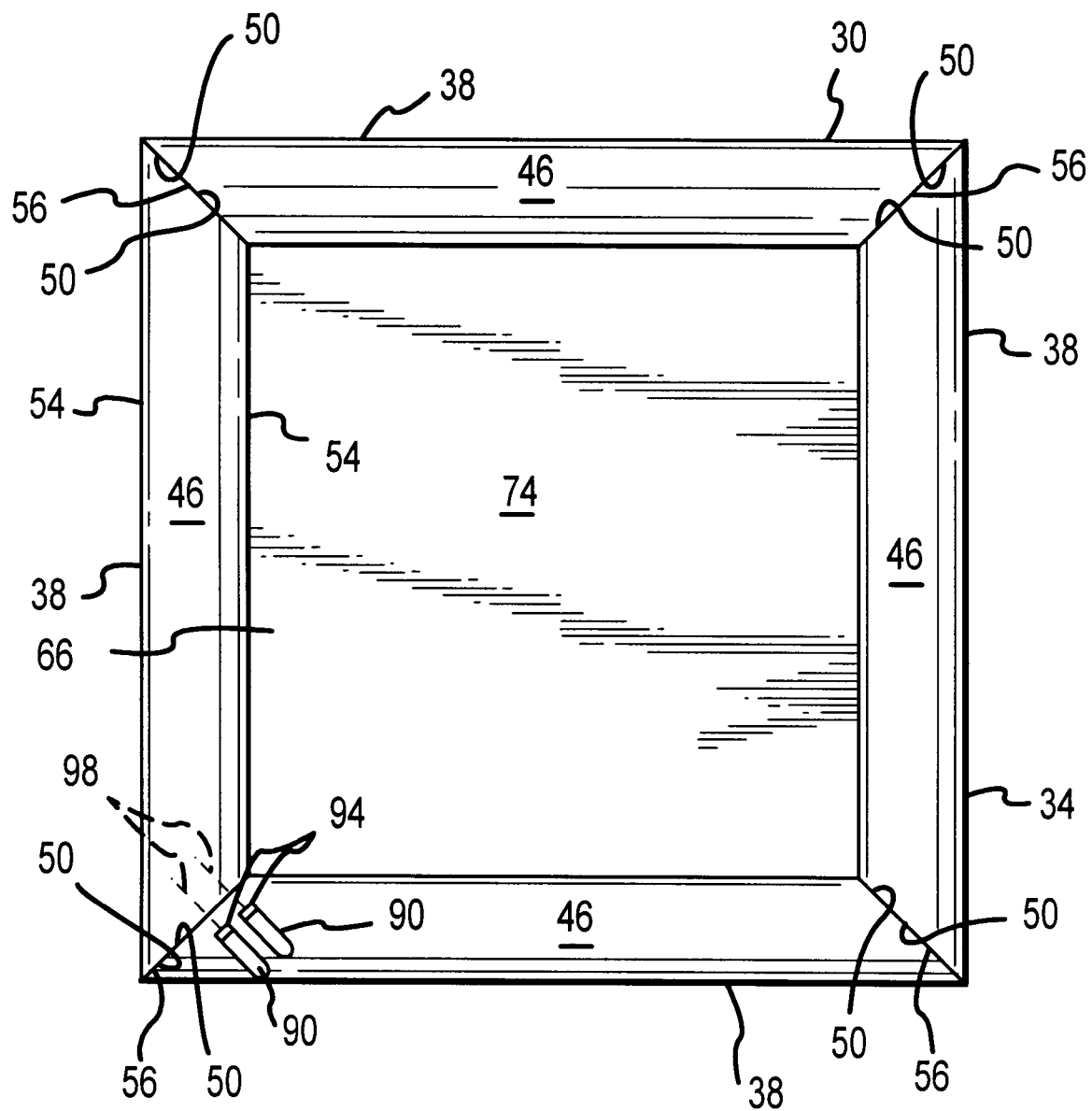
FIG. 3 is a plan view of a back surface of the door of FIG. 2.
Figure 4:
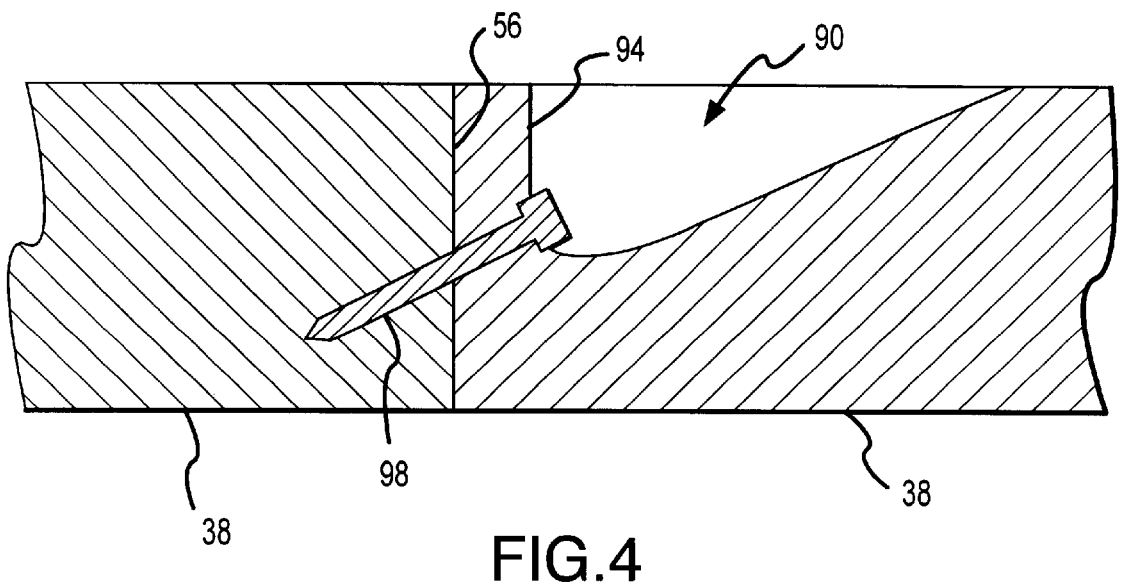
FIG. 4 is a across-sectional view of one of the miter joints between a pair of adjoining frame members of the door frame of the door of FIG. 2.

Each door frame member 38 includes a front surface 42, a back surface 46, a pair of laterally spaced sides 54 (the distance between which is a width dimension of the subject frame member 38), and a pair of longitudinally spaced ends 50 (the distance between which is a length dimension of the subject frame member 38) as illustrated in FIGS. 1–3. Each of these ends 50 is preferably mitered (e.g., at a 45° angle), and the abutting ends 50 of adjoining frame members 38 thereby define a miter joint 56. Rather robust configurations are intended for the door frame members 38. Therefore, in addition to the utilization of appropriate adhesives in each of the miter joints 56, the door frame members 38 which define each miter joint 56 are further attached to each other by at least one, and typically by at least two wood screws 98. In this regard, at least one groove 90 is formed in the back surface 46 of at least one door frame member 38 of each pair of adjoining door frame members 38 as illustrated in FIGS. 3–4 (only shown for one miter joint 56 in FIG. 3, but preferably the noted groove(s) 90 will be provided at each such miter joint 56). These grooves 90 increase in depth progressing toward the corresponding miter joint 56, and terminate in an end 94 which is sufficiently spaced from the corresponding miter joint 56 so as to not affect the integrity of the frame member 38 which includes these groove(s) 90. An appropriate wood screw 98 may be positioned within one of the grooves 90, and then directed through the end 94 of the groove 90 to the end 50 of frame member 38 having the groove(s) 90 formed therein, through the corresponding end 50 of the adjoining door frame member 38, and into the body of such door frame member 38 a sufficient distance to provide a robust interconnection between each of the door frame members 38 defining a miter joint 56 therebetween. The progressively increasing depth of the groove(s) 90 in the direction of the corresponding miter joint 56 facilitates the use of a screwdriver to install the screws 98.

Figure 5A:
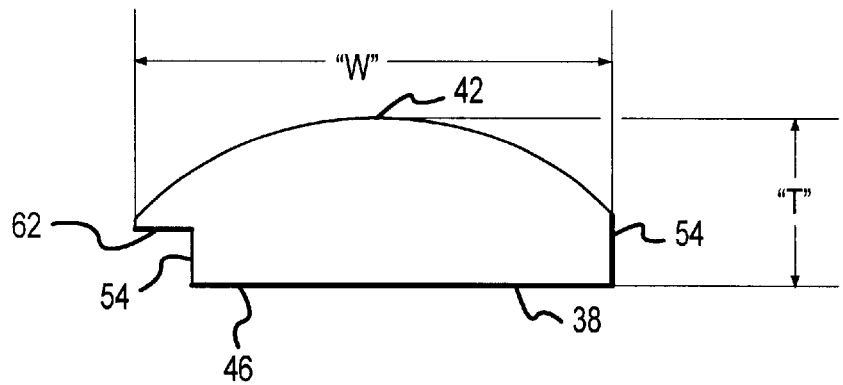
FIG. 5A is an cutaway view of one of the frame members of the door frame of the door of FIG. 2, taken perpendicularly to its longitudinal extent, which illustrates one embodiment of a profile for the front surface of such a door frame member.
Figure 5B:
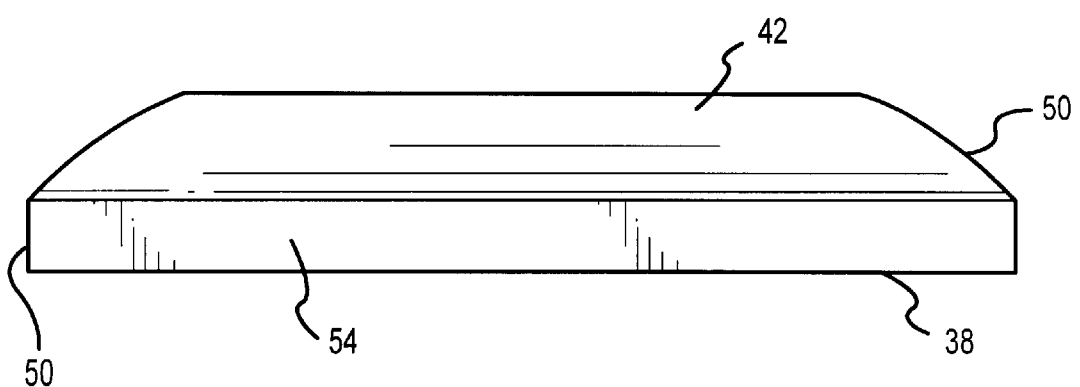
FIG. 5B is a side view of one of the frame members of the door frame of the door of FIG. 2.

FIGS. 5A-B further illustrates one embodiment of a profile for the front surface 42 of each of the door frame members 38 of the door frame 34. In this regard, the front surface 42 of each of the door frame members 38 may be characterized as being at least generally convexly-shaped. Another way to characterize each front surface 42 is as being continuously arcuate progressing between an upper extreme of its corresponding pair of sides 54 (e.g., sides 54 extend a distance of about ½–1 inch from the back surface 46 in one embodiment). In one embodiment the front surface 42 of each door frame member 38 is at least generally defined by a radius. However, the actual profile of the front surface 42 of each door frame member 38 need not conform exactly to a single, constant radius. Nonetheless, in one embodiment the front surface 42 of each door frame member 38 will at least generally correspond to a radius of about three inches. Other degrees of convexity may be used as well.

Further features of the door frame members 38 contribute to the appearance of the same being formed from logs or the like. In this regard, the width "W" of each frame member 38 will typically be at least about three inches, and in one embodiment is about four inches. Moreover, the point of maximum thickness "T" of each frame member 38 (e.g., the distance from the back surface 46 to the apex of its corresponding front surface 42) will typically be at least about 1 inch, and in one embodiment is about 1½ inches. Conventional boards which define door frames for prior art cabinetry typically have planar upper and lower surfaces, typically have a width of about 2¼ inches, and typically have a thickness of about ¾ inch.

As noted above, each door 30 includes a center panel assembly 64 with a center panel 66. Referring now to FIG. 5A in addition to FIGS. 1–3, the back surface 46 of each door frame member 38 includes a groove or notch 62 which extends along its most inwardly disposed side 54 (inwardly being defined relative to a perimeter of the door frame 34). The interface between the center panel 66 and each of the frame members 38 may define a simple lap joint. Appropriate adhesives may be used to attach the center panel 66 to each of the door frame members 38. Mechanical fasteners may be used as well.

One or more boards 82 may be appropriately secured to the front surface 70 of the center panel 66 as illustrated in FIGS. 1 and 2 to define the center panel assembly 64. FIGS. 1 and 2 illustrate these boards 82 as being of at least substantially uniform width, height, and thickness. Rather robust dimensions may also be used for the boards 82. In one embodiment the boards 82 each have a thickness "T" (e.g., FIG. 6) of at least about ¾ inches. An upper perimeter edge 86 of the boards 82 may be routered as desired (e.g., the edge 86 being the intersection of the planar upper surface with each of the four planar side surfaces), and the boards 82 will typically be vertically disposed, will typically extend at least substantially the entire distance between opposing horizontally disposed door frame members 38, and the number and/or width of boards 82 will typically be selected to occupy at least substantially all of the space of the center panel 66 extending between the pair of vertically spaced door frame members 38.

Figure 6:
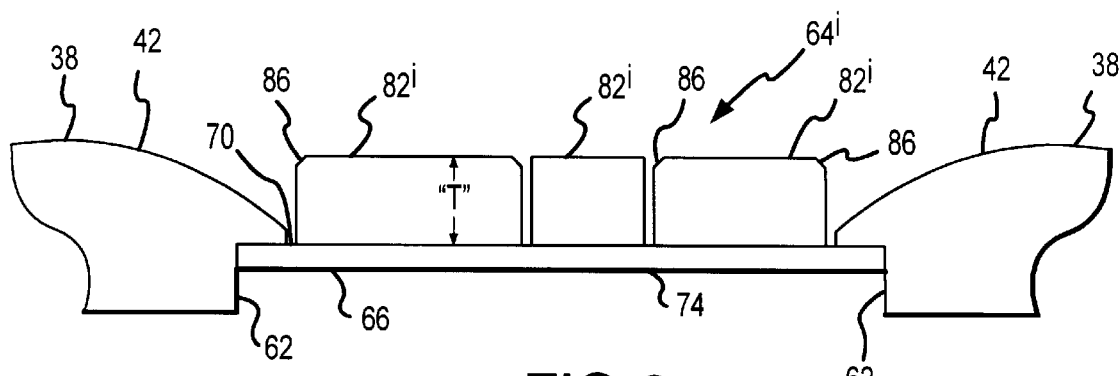
FIG. 6 is a cutaway view of another embodiment of a center panel assembly which may be used with the door frame of the door of FIG. 2.

FIG. 6 presents another embodiment of a center panel assembly 64$^i$ which may be used with the door frame 34 of FIGS. 1–4. The only substantial difference between the center panel assembly 64 of FIGS. 1–3 and the center panel assembly 64$^i$ of FIG. 6 is that each of the boards 82$^i$ have different widths in the case of FIG. 6, whereas in the FIGS. 1–3 embodiment the boards 82 have at least substantially the same width. Any combination of widths may thereby be used for the boards attached to the center panel of a given center panel assembly.

Figure 7:
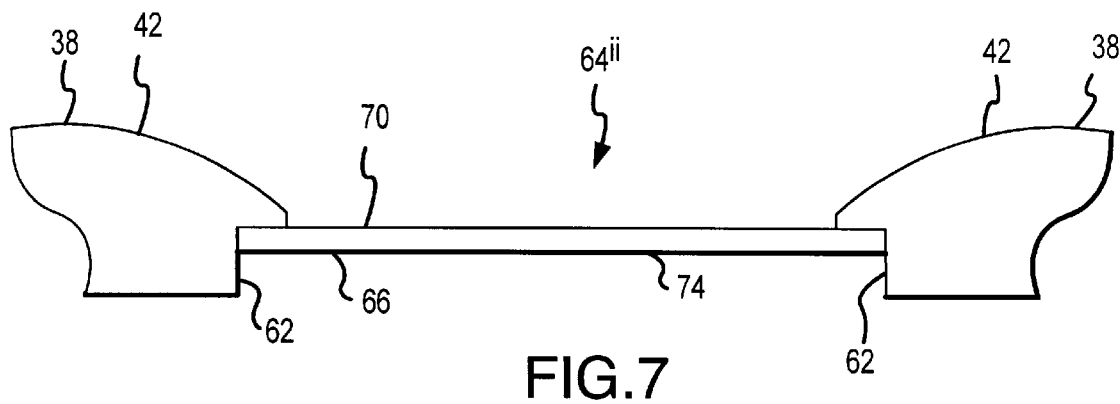
FIG. 7 is a cutaway view of another embodiment of a center panel assembly which may be used with the door frame of the door of FIG. 2.

FIG. 7 presents another embodiment of a center panel assembly 64$^{ii}$ which may be used with the door frame 34 of FIGS. 1–4. The center panel assembly 64$^{ii}$ differs from each of the center panel assembly 64 of FIGS. 1–3 and the center panel assembly 64$^i$ of FIG. 6 in that it does not include any boards 82, 82$^i$ on the front surface 70 of the center panel 66. However, at least generally the same center panel 66 is used, which has an at least substantially planar front surface 70 and an at least substantially planar back surface 74.

Although the center panel 66 of the FIGS. 1–3 and 6 embodiments will typically be formed from wood, the center panel 66 in the FIG. 7 embodiment may be formed from various types of glass as well (i.e., in addition to wood).

Figure 8:
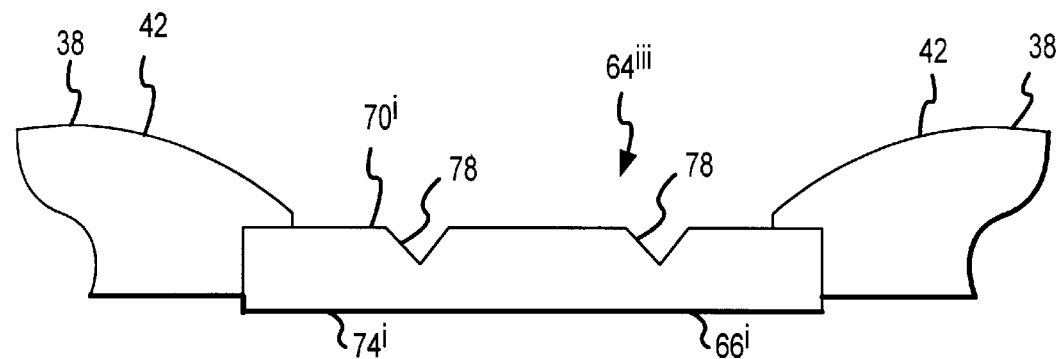
FIG. 8 is a cutaway view of another embodiment of a center panel assembly which may be used with the door frame of the door of FIG. 2.

FIG. 8 presents another embodiment of a center panel assembly $64^{iii}$ which may be used with the door frame 34 of FIGS. 1–4. The center panel assembly $64^{iii}$ differs from each of the center panel assembly 64 of FIGS. 1–3 and the center panel assembly $64^i$ of FIG. 6 in that it does not include any boards 82, $82^i$ on its front surface 70. The center panel assembly $64^{iii}$ also differs from the center panel assembly $64^{ii}$ of FIG. 7 in a number of respects. Initially, the center panel $66^i$ has an increased thickness over the center panel 66 presented in FIG. 7. In one embodiment the thickness of the center panel $66^i$ is at least about ¾ inches. Furthermore, the center panel $66^i$ also has a pair of vertically spaced, v-shaped grooves 78 which extend along at least substantially the entire height of the center panel $66^i$ (the distance between the pair of horizontally disposed door frame members 38).

Figure 9:
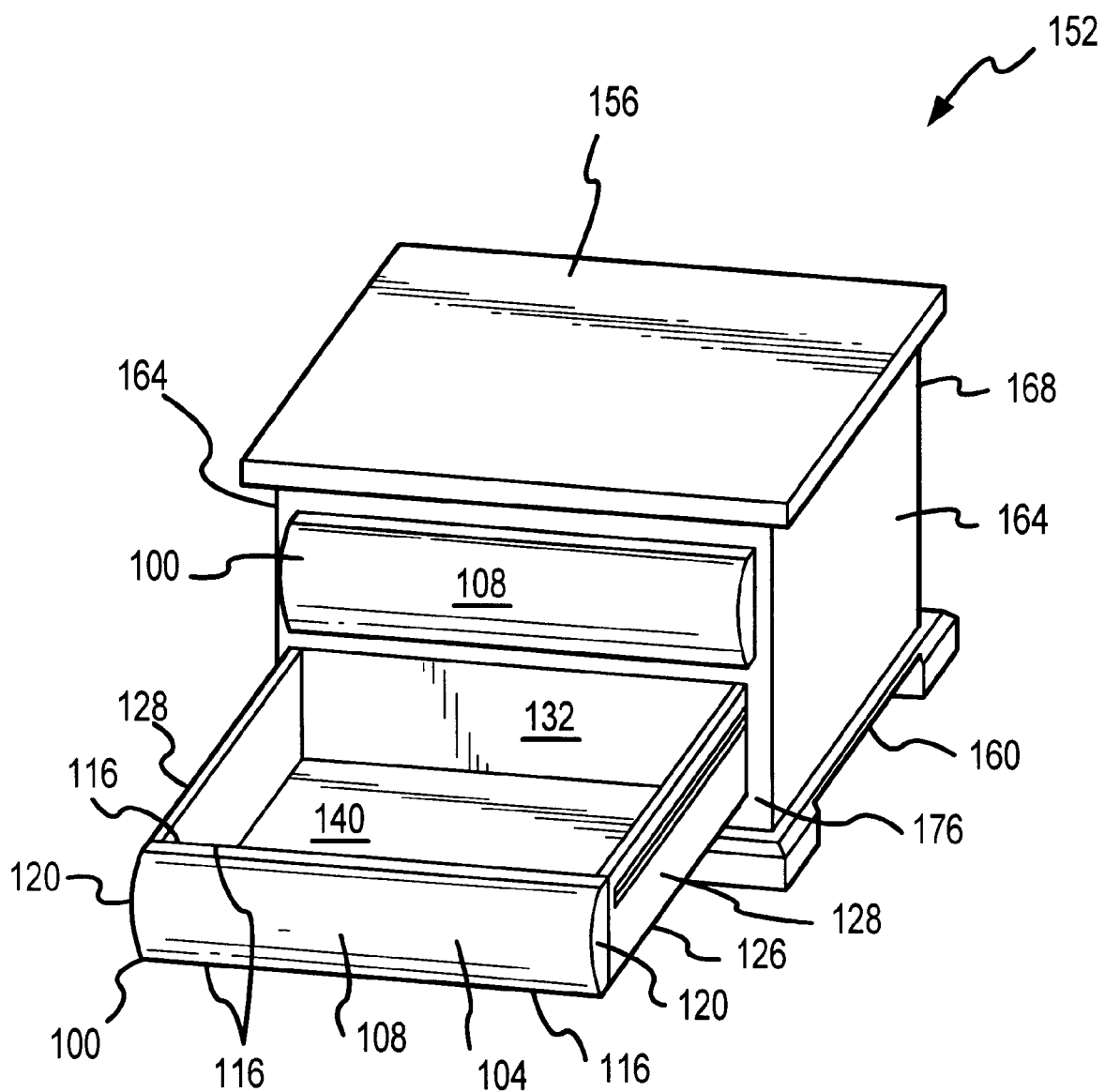
FIG. 9 is one embodiment of a dresser or the like which includes a pair of drawers, each with at least a log-like facing.

FIG. 9 presents what may be termed a storage cabinet 152 (e.g., dresser, night stand, end table). The storage cabinet 152 includes atop 156, a bottom 160, a pair of sides 164, and aback 168 to define at least part of a space or interior for the storage of appropriate items (e.g., clothes). Another portion of the storage cabinet 152 is its front 176 which also assists in the definition of the noted interior storage space and which will typically include a number of pieces of trim board. Access to the interior storage space of the storage cabinet 152 is provided by including at least one, and typically a plurality, of openings or accesses on the front 176 of the storage cabinet 152. Disposed within each these openings or accesses is a drawer 100 which may be opened and closed when providing/removing contents from the interior storage space of the storage cabinet 152. Appropriate slide/glide mechanisms or the like (not shown) may movably interconnect the drawers 100 with the storage cabinet 152. The basic structure of the drawers 100 may be used with various other types of furniture.

Figure 10:
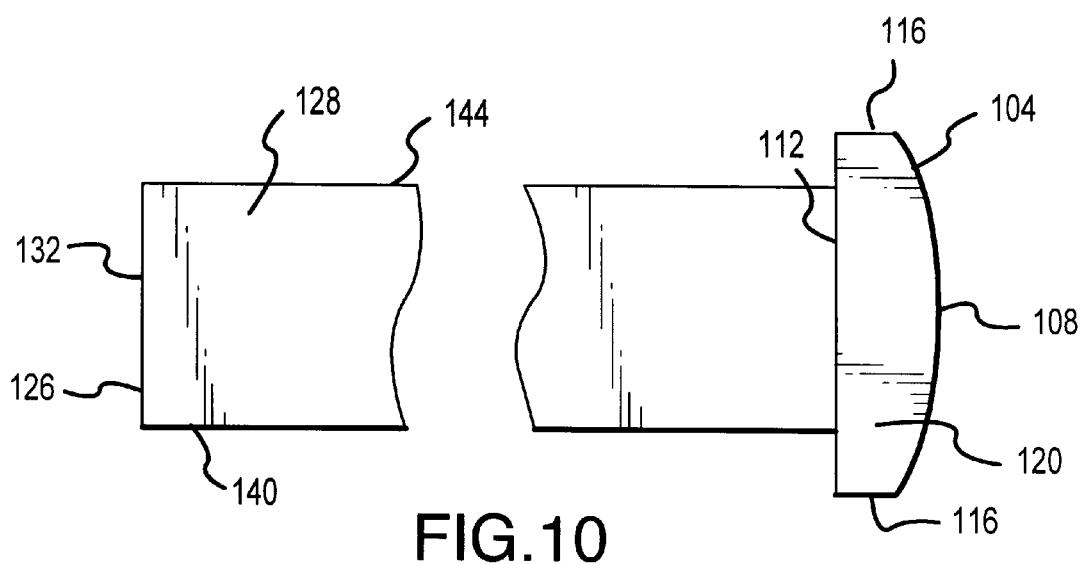
FIG. 10 is a side view of one of the drawers from the dresser of FIG. 9.

Reference will now be made to FIGS. 9–10. Each drawer 100 includes a conventional drawer body 126, namely a pair of laterally spaced drawer sides 128, a drawer bottom 140, a drawer back 132, and possibly a drawer front (not shown), which are appropriately interconnected and which collectively define a storage space which is accessed through an open top 144. Attached to this conventional drawer body 126 is a drawer facing 100 having a front surface 108 and a back surface 112. The facing 104 of each drawer 100 is appropriately attached to the drawer body 126 (opposite the drawer back 132), such as by an adhesive(s), one or more mechanical fasteners, or both.

The profile of the front surface 108 of the facing 104 for each drawer 100 of FIGS. 9–10 is at least generally the same as the profile for the frame members 38 noted above. In this regard, the facing 104 includes a pair of laterally spaced facing sides 116 and a pair of longitudinally spaced facing ends 120 (only one shown in FIG. 10). The front surface 108 of the facing 104 for each drawer 100 may be characterized as being convexly-shaped. Another way to characterize the front surface 108 is as being continuously arcuate progressing between its pair of facing sides 116. In one embodiment, the front surface 108 is at least generally defined by a radius. However, the actual profile the front surface 108 need not conform exactly to a single, constant radius. Nonetheless, in one embodiment the front surface 108 will at least generally correspond to a radius of about three inches. Other degrees of convexity may be used as well.

Figure 11:
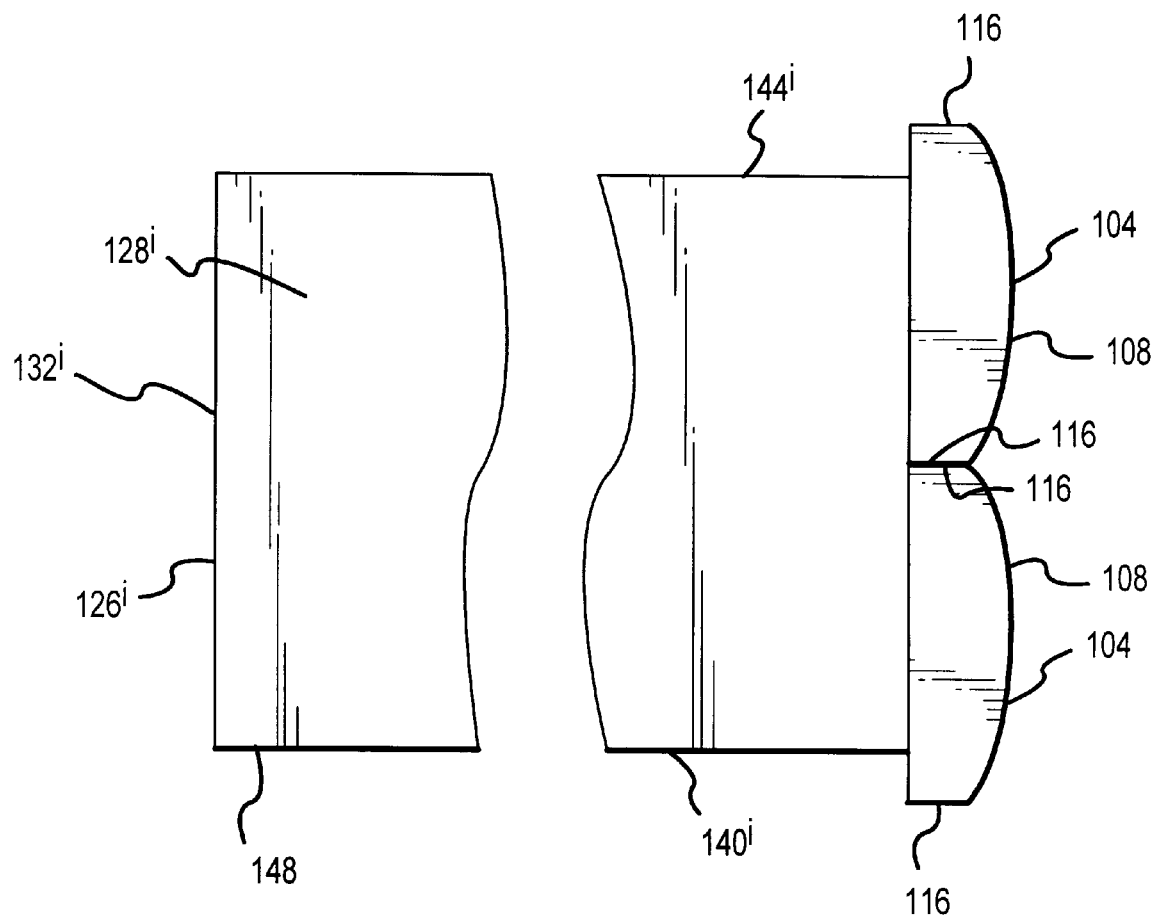
FIG. 11 is a side view of another embodiment of a drawer which may be used by a dresser similar to that presented in FIG. 9, but with a larger drawer opening.

Another embodiment of a drawer which may be used with the storage cabinet 152 of FIGS. 9–10 is illustrated in FIG. 11. Components of the drawer 148 of FIG. 11 which at least generally correspond with those presented in FIG. 10, but which differ therefrom in some manner, use the same reference numeral with a superscripted "i" designation. The main difference between the drawer 148 and the drawer 100 is that the drawer 148 utilizes two facings 104 versus the single one used in the FIG. 10 embodiment. The pair of facings 104 used by the drawer 148 are disposed in a stacked relation with a side 116 of each such facing 104 being disposed in abutting engagement. This configuration accommodates a larger dimension for the drawer side $128^i$ than used by the FIG. 10 embodiment.

One embodiment of a machine generally of the type which may be used to form any of the door frame members and/or drawer facings presented herein is illustrated in FIG. 12 in the form of a woodworking moulder 200. Various moulders of this general type are known in the art, such as described in U.S. Pat. No. 4,512,114, which issued on Apr. 23, 1985, and which is entitled "Method for High Tooth Equalization of Cutters", the entire disclosure of which is incorporated by reference herein. Moulders of this general type are also available from a variety of sources such as Lobo Machine Corp. of St. Pico Rivera, California and Wadkin North America of Greensboro, North Carolina. However, the inventor of the subject patent application is unaware of any prior use of these known moulders to form the types of profiles noted above in relation to the door frame members 38 and/or the door facings 104.

The moulder 200 of FIG. 12 generally includes a base 204 with a number of cutter head slots 208 formed therein, as well as an extension 212 which extends vertically upward from the base 204. One cutter head 216 is appropriately secured to a mounting block 224 for rotation about an axis 226. This mounting block 224 is disposed within one of the cutter head slots 208 for lateral movement at least generally in the direction of the arrow 228 (i.e., at least generally perpendicular to the direction that a piece of wood feedstock travels through the moulder 200), for instance to provide a width adjustment feature for the moulder 200. Vertical adjustment capabilities for the cutter head 216 could also be utilized by the moulder 200 (not shown). Appropriately mounted on the cutter head 216 in radially spaced relation (i.e., at different angular positions relative to the rotational axis 226) are a plurality of radially spaced knives 220. More than one of these cutter heads 216 could be longitudinally spaced on the moulder 200 so as to remove a first portion of material from a piece of feedstock with a first cutter head 216, and so as to thereafter remove a second portion of material from this same piece of feedstock with the a second, longitudinally displaced cutter head 216 and which would also be disposed at a different lateral position in this case (i.e., to reduce the width of a piece of feedstock on an incremental basis).

Another cutter head 232 is appropriately secured to a mounting block 240 for rotation about an axis 248. This mounting block 240 is also disposed within one of the cutter head slots 208 on the base 204 for lateral movement at least generally in the direction of the arrow 244, for instance to provide a width adjustment feature for the moulder 200. Vertical adjustment capabilities for the cutter head 232 could also be utilized by the moulder 200 (not shown). Appropriately mounted on the cutter head 232 in radially spaced relation (i.e., at different angular positions relative to the rotational axis 248) are a plurality of radially spaced knives 236. The cutter head 208 and cutter head 232 may be disposed at the same longitudinal position, but will more likely be disposed at different longitudinal positions (i.e., the longitudinal direction being perpendicular to the direction of the arrows 228 and 244, and corresponding with the direction that a piece of "feedstock" would be directed through the moulder 200) on the moulder 200 (i.e., longitudinally spaced). More than one of these cutter heads 232 could be longitudinally spaced on the moulder 200 so as to remove a first portion of material from a piece of feedstock with a first cutter head 232, and so as to thereafter remove a second portion of material from this same piece of feedstock with a second, longitudinally displaced cutter head 232 and which would also be disposed at a different lateral position in this case (i.e., to reduce the width of a piece of feedstock on an incremental basis).

Yet another cutter head 252 is rotatably mounted to the extension 212 for rotation about an axis 260. Horizontal (e.g., "lateral", or perpendicular to the above-noted longitudinal direction), vertical, or both types of adjustment capabilities may be utilized by the moulder 200 in relation to the cutter head 252. Appropriately mounted on the cutter head 252 in radially spaced relation (i.e., at different angular positions relative to the rotational axis 260) are a plurality of radially spaced knives 256. The cutter head 252 may be disposed at the same longitudinal position as the cutter head 216 and/or cutter head 232, but will more likely be disposed at a different longitudinal position on the moulder 200 (i.e., longitudinally spaced). More than one of these cutter heads 252 could be longitudinally spaced on the moulder 200 so as to remove a first portion of material from a piece of feedstock with a first cutter head 252, and so as to thereafter remove a second portion of material from this same piece of feedstock with a second, longitudinally displaced cutter head 252 and which would also be disposed at a different vertical position in this case (i.e., to reduce the height of a piece of feedstock on an incremental basis).

The profile of the door frame members 38 noted above could be affected by positioning the cutter head 216, cutter head 232, and cutter head 252 in a certain relative positional relationship, and further by using a certain profile for the cutting edge for the knives of the various cutter heads of the moulder 200, all of which is illustrated in FIG. 13. Both the knives 220 on the cutter head 216 and the knives 236 on the cutter head 232 may be substantially planar members with a longitudinally-extending cutting edge for the case of producing the door frame members 38 from a piece of feedstock (e.g., a 2×6). These knives 220 and 236 produce the desired contour for the sides 54 of the door frame member 38. In contrast to the cutting edges of the knives 220 and 236, the cutting edge of the knives 256 for the cutter head 252 is arcuately shaped to define the contour of the front surface 42 of the door frame member 38. As can be appreciated, other profiles for the front surface 42 of the door frame members 38, as well as for the front surface 108 of the facing 104 for the drawer 100, may be realized by using an appropriately contoured cutting edge for the knives 256. Other techniques may be available to produce the noted profile for the frame members 38 and facing 104 for the drawer 100 as well.

Usually after the general profile for the frame members 3 8 illustrated in FIG. 13 is achieved in the above-noted manner, the frame members 38 would be cut to the desired length by mitering a pair of ends 50 therefore. It may be possible to first produce individual frame members 38 of the desired length with its ends 50 being mitered before shaping of the same into the desired profile with the moulder 200 as well In any case, the door frame 34 would then be assembled based upon the above-noted discussion, followed by installation of the center panel 66. The resulting door 30 could then be attached to the cabinet 2. Similar techniques would be used for assembling the drawer 104 (i.e., the facing 104 would be formed into the desired shape, followed by assembling the drawer 104 using the same).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A storage device comprising:
   an enclosure;
   a first opening in said enclosure;
   a door movably interconnected with said enclosure in alignment with said first opening, wherein said door comprises a frame, wherein said frame consists of a plurality of one-piece frame members that collectively define a perimeter of said door such that no portion of said door extends beyond said frame members, wherein each said frame member comprises a front surface which projects away from said enclosure and a back surface which projects toward said enclosure when said door closes said first opening, wherein a thickness of each said frame member is measured between its said front and back surfaces, wherein each said frame member comprises a pair of ends and a pair of sides extending between said pair of ends, wherein a length of each said frame member is measured between its said pair of ends, wherein a width of each said frame member is measured between its said pair of sides, wherein said front surface of each said frame member is convexly-shaped progressing from one of its said sides to the other of its said sides, wherein said width of each said frame member is at least about three inches, wherein a maximum thickness of each same frame member is at least about 1.5 inches, and wherein each said frame member at least simulates a profile of a log.

2. A storage device, as claimed in claim 1, wherein: said enclosure comprises a cabinet.

3. A storage device, as claimed in claim 1, wherein: each said end of each said frame member is mitered.

4. A storage device, as claimed in claim 1, wherein: each said end of each said frame member is disposed in abutting engagement with another said frame member at least generally proximate one of its said ends to define a joint therebetween, wherein said back surface of at least one of said frame members comprises at least one groove which is disposed at least generally proximate one of said joints, which extends toward another of said frame members which defines said one of said joints, and which increases in depth progressing toward said one of said joints, wherein said frame further comprises a screw having a head which is disposed in an end of said groove and further having a body which extends through said one of joints and into said another said frame member.

5. A storage device, as claimed in claim 1, wherein:

each said frame member further comprises a groove which extends along an entirety of its inwardly disposed said side, wherein said door further comprises a panel which is set in said groove on said back surface of each said frame member.

6. A storage device, as claimed in claim 5, wherein:

said panel is wood.

7. A storage device, as claimed in claim 5, wherein:

said panel comprises a front surface and a back surface, wherein said door further comprises at least one board separately attached to said front surface of said panel.

8. A storage device, as claimed in claim 7, wherein:

each said board comprises a facing and a perimeter which extends from said facing toward said front surface of said panel and which defines an edge with said facing, wherein at least a portion of said edge of each said board is routered.

9. A storage device, as claimed in claim 1, wherein:

said front surface of each said frame member is at least generally defined by a radius extending between its said pair of sides.

10. A storage device, as claimed in claim 9, wherein:

said radius is at about 3 inches.

11. A storage device, as claimed in claim 1, wherein:

four of said frame members define said frame and in at least one of a rectangular or square configuration.

12. A storage device, as claimed in claim 1, wherein:

said front surface of each said frame member is at least substantially continuously arcuate extending between its said pair of sides.

13. A storage device, as claimed in claim 1, wherein:

said door further comprises a panel assembly that is interconnected with said frame.

* * * * *